(12) United States Patent
Bachmann et al.

(10) Patent No.: US 11,588,431 B2
(45) Date of Patent: Feb. 21, 2023

(54) AIRCRAFT DRIVE SYSTEM

(71) Applicant: Rolls-Royce Deutschland Ltd & Co KG, Blankenfelde-Mahlow (DE)

(72) Inventors: Christian Bachmann, Munich (DE); Dominik Bergmann, Sachsenkam (DE); Holger Markmann, Munich (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 114 days.

(21) Appl. No.: 17/258,671

(22) PCT Filed: Jul. 10, 2019

(86) PCT No.: PCT/EP2019/068565
§ 371 (c)(1),
(2) Date: Jan. 7, 2021

(87) PCT Pub. No.: WO2020/011867
PCT Pub. Date: Jan. 16, 2020

(65) Prior Publication Data
US 2021/0281210 A1   Sep. 9, 2021

(30) Foreign Application Priority Data

Jul. 11, 2018 (DE) .................... 10 2018 211 459.5

(51) Int. Cl.
*H02P 1/00*       (2006.01)
*H02P 29/028*    (2016.01)
(Continued)

(52) U.S. Cl.
CPC .......... *H02P 29/028* (2013.01); *B60L 3/0092* (2013.01); *B60L 15/20* (2013.01);
(Continued)

(58) Field of Classification Search
CPC .......... B64F 5/60; H02P 29/028; H02P 25/22; B60L 50/60; B60L 58/10; B60L 3/0092;
(Continued)

(56) References Cited

U.S. PATENT DOCUMENTS

| | | |
|---|---|---|
| 2011/0024555 A1 | 2/2011 | Kuhn, Jr. |
| 2013/0094963 A1 | 4/2013 | Rolt |
| 2017/0253344 A1 | 9/2017 | Wangemann |

FOREIGN PATENT DOCUMENTS

| | | |
|---|---|---|
| DE | 202015106564 U1 | 3/2016 |
| DE | 102015215430 A1 | 2/2017 |

(Continued)

*Primary Examiner* — Karen Masih
(74) *Attorney, Agent, or Firm* — Lempia Summerfield Katz LLC

(57) ABSTRACT

The disclosure relates to a hybrid-electrical drive system for an aircraft having two subsystems that are largely independent of each other. A stator winding of a common electrical machine is assigned to each of the subsystems such that both subsystems may be supplied with electrical energy from the common electrical machine. If a defect occurs in one of the subsystems, the drive system may be configured such that electrical energy from a battery of the non-defective subsystem may be transferred into the defective subsystem by utilizing the two stator winding systems.

20 Claims, 1 Drawing Sheet

(51) Int. Cl.
    *B64F 5/60*     (2017.01)
    *B60L 50/60*     (2019.01)
    *B60L 58/10*     (2019.01)
    *B60L 3/00*     (2019.01)
    *B60L 15/20*     (2006.01)
    *B64D 27/24*     (2006.01)
    *B64D 31/00*     (2006.01)
    *H02P 25/22*     (2006.01)
    *F02B 63/04*     (2006.01)
    *F02C 6/20*     (2006.01)
    *F02D 29/06*     (2006.01)

(52) U.S. Cl.
    CPC .............. B60L 50/60 (2019.02); B60L 58/10 (2019.02); B64D 27/24 (2013.01); B64D 31/00 (2013.01); B64F 5/60 (2017.01); H02P 25/22 (2013.01); *B60L 2200/10* (2013.01); *B60L 2220/54* (2013.01); *B64D 2221/00* (2013.01); *F02B 63/042* (2013.01); *F02C 6/20* (2013.01); *F02D 29/06* (2013.01); *F05D 2220/323* (2013.01); *F05D 2220/76* (2013.01)

(58) Field of Classification Search
    CPC ................ B60L 15/20; B60L 2200/10; B60L 2220/54; B64D 27/24; B64D 31/00; B64D 2219/00
    See application file for complete search history.

(56) References Cited

FOREIGN PATENT DOCUMENTS

| | | |
|---|---|---|
| DE | 102017217298 A1 | 3/2019 |
| EP | 3090951 A1 | 11/2016 |
| EP | 3246249 A1 | 11/2017 |
| GB | 2540212 A | 1/2017 |
| WO | 2015106993 A1 | 7/2015 |
| WO | 2015128121 A1 | 9/2015 |
| WO | 2017009037 A1 | 1/2017 |
| WO | 2017025224 A1 | 2/2017 |
| WO | 2017114643 A1 | 7/2017 |
| WO | WO-2017114643 A1 * | 7/2017 |

\* cited by examiner

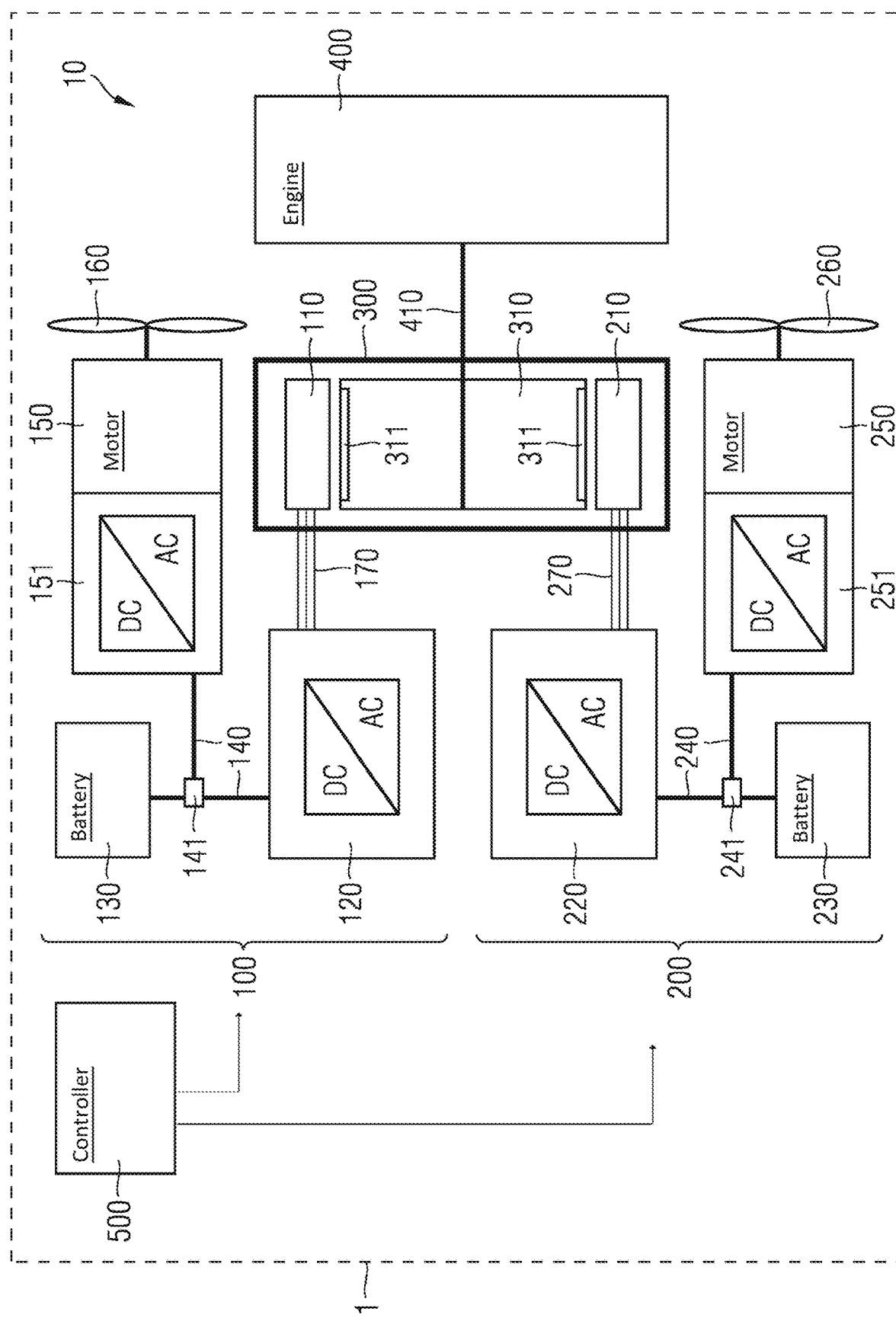

AIRCRAFT DRIVE SYSTEM

The present patent document is a § 371 nationalization of PCT Application Serial No. PCT/EP2019/068565, filed Jul. 10, 2019, designating the United States, which is hereby incorporated by reference, and this patent document also claims the benefit of German Patent Application No. 10 2018 211 459.5, filed Jul. 11, 2018, which is also hereby incorporated by reference.

TECHNICAL FIELD

The disclosure relates to an electrical drive system for an aircraft. In particular, the disclosure relates to a redundant hybrid-electric drive system for providing kinetic energy for a propulsion system or component of an aircraft.

BACKGROUND

As alternatives to customary internal combustion engines, concepts based on electric drive systems are being investigated and used for mobile applications, for example, for driving aircraft such as airplanes or helicopters, or else for electrically driven land vehicles or watercraft, etc. An electric drive system of this kind, which may be designed as a purely electric or else as a hybrid-electric drive system, may have at least one electrical machine operated as an electric motor for driving the propulsion system or component of the aircraft. Furthermore, an appropriate source of electrical energy for supplying the electric motor and, for example, a power electronics system and the appropriate cabling for electrically connecting the components of the drive system, with the aid of which the electric motor is operated, are provided. In a hybrid-electric drive system, an internal combustion engine is provided, wherein the internal combustion engine is integrated into the drive system in series or in parallel and drives, for example, a generator which for its part provides electrical energy which may be stored in a battery and/or fed to the electric motor.

Systems of this kind are described, for example, in WO2015106993A1, WO2015128121A1 and in WO2017025224A1.

In the case of electrical operation in particular of an aircraft, a fault in the electric drive system may result in the aircraft crashing, this being associated with corresponding hazards to passengers and potentially accompanied by considerable damage to property. In the case of the hybrid-electric drive system, a fault may occur in any of the components of the drive system listed by way of example in the introductory part, that is to say amongst others in the energy storage device which delivers the electrical energy for supplying the electric motor, in the power electronics system of the electric motor which, for example, amongst other things converts a direct current into an alternating current for the electric motor, in the electric motor itself, in the generator and/or in a power electronics system associated with the generator.

In order to reduce the risks due to a fault in the electric drive system, it has been proposed to operate the vehicle with a redundant drive system which has two or more drive subsystems which are largely independent of one another. In this context, the term "redundant" may mean that increased security against a fault is achieved by a multiple design of components. In the event of failure of one of the drive subsystems, the remaining system would be sufficient to provide safe onward flight and safe landing. In spite of the redundancy, failure of components located in the drive subsystems may still occur there, where further disadvantageous situations, such as asymmetrical states of charge or aging of the batteries etc., may additionally also occur.

SUMMARY AND DESCRIPTION

An object of the present disclosure is therefore to specify a hybrid-electric drive system for an aircraft with increased fail-safety.

This object is achieved by a drive system and an operating method. The scope of the present disclosure is defined solely by the appended claims and is not affected to any degree by the statements within this summary. The present embodiments may obviate one or more of the drawbacks or limitations in the related art.

An aircraft drive system of this kind has at least one first and one second subsystem, wherein all subsystems are provided for generating propulsion for the aircraft. The first subsystem has, for example, amongst other things, a first propeller, a first electric motor for driving the first propeller, and a first battery. The first electric motor may be supplied with electrical energy selectively and in a manner controlled by the controller by the first battery and/or via the first stator winding system. The second subsystem has, for example, amongst other things, a second propeller, a second electric motor for driving the second propeller, and a second battery. The second electric motor may be supplied with electrical energy selectively and in a manner controlled by the controller by the second battery and/or via the second stator winding system. Furthermore, an electrical machine including a first stator winding system and a second stator winding system is provided. In a normal mode of the drive system, a voltage which is induced in the first stator winding system may be fed as electrical energy to the first subsystem for supplying components of the first subsystem which are arranged there, for example, the first battery and the electric motor of the first subsystem. Therefore, the first battery may be charged and/or the motor may be supplied with energy. Accordingly, the motor of the first subsystem may selectively draw electrical energy from the battery or from the first stator winding system. In a corresponding manner, a voltage which is induced in the second stator winding system may be fed as electrical energy to the second subsystem for supplying components of the second subsystem, for example, the second battery and the electric motor of the second subsystem. Therefore, the second battery may be charged and/or the second motor may be supplied with energy. Accordingly, the motor of the second subsystem may selectively draw electrical energy from the second battery or from the second stator winding system. Accordingly, the electrical machine operates as a generator or in a purely generating manner in the normal mode. Furthermore, the drive system has a controller which is designed to establish an operating state of the drive system and in so doing to also initiate a change between the possible operating states in such a way that the drive system may be operated in the normal mode or in a motor operating state. In particular, it is the case that in the motor operating state in a manner controlled by the controller one of the subsystems is defined as a supplying subsystem and a further one of the subsystems is defined as a subsystem to be supplied, wherein electrical energy may be transmitted from the supplying subsystem, via the stator winding systems of the electrical machine, to the subsystem to be supplied.

The disclosure accordingly relates to a hybrid-electric drive system for an aircraft including two subsystems which are largely independent of one another. A stator winding of a common electrical machine is associated with each of the subsystems, so that the two subsystems may be supplied with electrical energy by the common electrical machine. If a fault occurs in one of the subsystems, the drive system is to be designed in such a way that electrical energy may be transferred from a battery of the non-faulty subsystem, by utilizing the two stator winding systems, to the faulty subsystem. The concept on which the disclosure is based is to transmit energy from one subsystem of the drive system to the respectively other subsystem by a torque on the generator shaft, which torque may be neutral for the internal combustion engine in total, via the winding systems of the generator.

The stator winding systems are arranged independently of one another and in such a way that each of the stator winding systems interacts in an electromagnetic manner with magnetic components of a common rotor of the electrical machine, for example, for generating the respective induced voltage. Accordingly, a separate rotor is not provided for each of the stator winding systems. The electrical machine has a rotor with a large number of magnetic components, (e.g., permanent magnets), which interact in an electromagnetic manner with the two stator winding systems in a known manner. Accordingly, the rotor is referred to as a common rotor. The presence of a common rotor which interacts in an electromagnetic manner with the two stator winding systems ultimately renders possible energy transmission with the aid of the stator winding systems.

The controller is designed to monitor the subsystems in respect of the occurrence of a fault in the respective subsystem and to initiate a change from the normal mode to the motor operating state when a fault is detected in one of the subsystems, wherein that subsystem in which the fault is present is defined as the subsystem to be supplied. The monitoring allows a largely immediate response to the occurrence of a fault.

Furthermore, the controller is designed to determine a power P_gen(t) which is currently provided by the electrical machine and to be able to initiate a change from the normal mode to the motor operating state at a time $t=T1$ only when $P\_gen(T1) \leq thres\_gen*P\_gen\_max$, where P_gen_max is a maximum power that may be provided by the electrical machine and thres_gen is a threshold value which may be prespecified by the controller, where $0 \leq thres\_gen < 1$, in particular $0 \leq thres\_gen < 1/n$, where n represents the number of subsystems. Therefore, the transmission of energy is only possible when the electrical machine is not currently being operated at its maximum power.

Here, and in the text which follows, the term "currently" means, in particular, that the respectively corresponding time is as close as possible to the time at which the fault occurs, or the fault is detected, in order to minimize delays in the response to the fault.

In addition or as an alternative, the controller is designed to determine a power P_bat(t) which is currently provided by a respective battery of the supplying subsystem and to be able to initiate the transmission of electrical energy from the supplying subsystem to the subsystem to be supplied starting from a time $t \geq T2$ only when $P\_bat(T2) \leq thres\_bat*P\_bat\_max$, where P_bat_max is a maximum power that may be provided by the battery of the supplying subsystem and thres_bat is a threshold value which may be prespecified by the controller, where $0 \leq thres\_bat < 1$. Therefore, the transmission of energy is only possible when the battery of the supplying subsystem is not operated at its maximum power at the time of the desired change.

Times T1 and T2 may be identical or immediately follow one another. Ultimately, the two conditions may be met, so that the controller may initiate the change in operating state to the motor state.

The controller is designed, in particular, to define the threshold values thres_gen, thres_bat depending on the type of fault detected and/or depending on a current flight situation. In this case, the type of fault may already be defined, for example, by way of the component of the faulty subsystem in which the fault occurred. The flexibility achieved in this way provides that a sufficient amount of energy is supplied to the subsystem to be supplied, while it is provided at the same time that not too much energy is drawn from the supplying subsystem.

In each case, at least a portion of the energy which is transmitted by the supplying subsystem to the subsystem to be supplied may be fed to the battery of the subsystem to be supplied and/or to the electric motor or its power electronics system of the subsystem to be supplied, wherein the controller is designed to control the flows of the transmitted energy in the subsystem to be supplied.

In order to operate an aircraft drive system of this kind which may be selectively operated in a normal operating state and in a motor operating state, in the normal operating state a voltage which is induced in the first stator winding system is therefore fed as electrical energy to the first subsystem and a voltage which is induced in the second stator winding system is therefore fed as electrical energy to the second subsystem. In the motor operating state, one of the subsystems is defined as a supplying subsystem and a further one of the subsystems is defined as a subsystem to be supplied. Finally, electrical energy is transmitted from the supplying subsystem, via the stator winding systems of the electrical machine, to the subsystem to be supplied.

The subsystems are monitored by the controller and a corresponding sensor system in respect of the occurrence of a fault in the respective subsystem. When a fault is detected in one of the subsystems, a change from the normal mode to the motor operating state is initiated and the subsystem in which the fault was detected is defined as the subsystem to be supplied.

In particular, when the occurrence of a fault is detected, (e.g., starting from the time of detection, but possibly also continuously and therefore independently of whether a fault has occurred), a power P_gen(t) which is currently provided by the electrical machine is determined, wherein a change from the normal mode to the motor operating state is initiated at a time $t=T1$ only when:

$$P\_gen(T1) \leq thres\_gen*P\_gen\_max,$$

where P_gen_max is a maximum power that may be provided by the electrical machine and thres_gen is a threshold value which may be prespecified by the controller, where $0 \leq thres\_gen < 1$.

Once again, in particular, when the occurrence of a fault is detected, (e.g., starting from the time of detection, but possibly also continuously and therefore independently of whether a fault has occurred), a power P_bat(t) which is currently provided by a respective battery of the supplying subsystem is determined and the transmission of electrical energy from the supplying subsystem to the subsystem to be supplied is initiated starting from a time $t \geq T2$ only when:

$$P\_bat(T2) \leq thres\_bat*P\_bat\_max,$$

where P_bat_max is a maximum power that may be provided by the battery of the supplying subsystem and thres_bat is a threshold value which may be prespecified by the controller, where 0≤thres_bat<1. Therefore, the transmission of energy is only possible when the battery of the supplying subsystem is not operated at its maximum power at the corresponding time.

Times T1 and T2 may be identical or immediately follow one another. Ultimately, the two conditions may be met, so that the controller may initiate the change in operating state to the motor state.

The threshold values thres_gen, thres_bat may be defined depending on the type of fault detected and/or depending on a current flight situation in order to provide largely safe operation of the drive system. Flight situations may be take-off, landing, or cruising.

In each case, at least a portion of the energy which is transmitted by the supplying subsystem to the subsystem to be supplied is fed there to a battery and/or to an electric motor or its motor power electronics system, wherein the controller is designed to control the flows of the transmitted energy in the subsystem to be supplied.

BRIEF DESCRIPTION OF THE DRAWINGS

Further advantages and embodiments may be found in the drawings and the corresponding description.

In the text which follows, the disclosure and exemplary embodiments will be explained in more detail with reference to drawings.

In the Drawings:

FIG. 1 depicts an example of a drive system for an aircraft.

DETAILED DESCRIPTION

As disclosed herein, terms such as "axial," "radial," "tangential," or "in the circumferential direction," etc. relate to the shaft or axis used in the respective FIGURE or in the example described in each case. In other words, the directions axially, radially, and tangentially relate to a rotation axis of the rotor. "Axial" describes a direction parallel to the axis of rotation, "radial" describes a direction orthogonal to the axis of rotation, toward or away therefrom, and "tangential" is a movement or direction orthogonal to the axis and orthogonal to the radial direction, which is thus directed at a constant radial distance from the rotation axis and with a constant axial position in a circle around the rotation axis. The tangential direction may optionally also be referred to as the circumferential direction.

The term "electromagnetic interaction" means the interaction, known in an electrical machine, between the magnetic fields of the magnetic components of the rotor, (e.g., permanent magnets), and the magnetic components of the stator, (e.g., coils through which current flows), based on which the electric motor develops its torque or based on which a generator supplies an electric current.

FIG. 1 shows, by way of example and in a simplified manner, a hybrid-electric drive system 10. The drive system 10 has two largely independent subsystems 100, 200 of largely identical construction.

The first subsystem 100 includes a first stator winding system 110 of a common electrical machine 300 of the drive system 10, a first power electronics system 120, a first battery 130, a first DC cabling arrangement 140 with a first branch point 141, and a first electric motor 150 with a first motor power electronics system 151, wherein the first motor 150 is mechanically coupled to a first propeller 160 of the first subsystem 100. The electrical machine 300 is used as a generator in the normal mode of the drive system 10. The basic mode of operation is based on the concept that the first electric motor 150, when it is supplied with electrical energy by the first battery 130 and/or by the electrical machine 300 in the generator mode and via a respective motor power electronics system 151 and possibly via the first power electronics system 120, sets the first propeller 160 in rotation and in this way generates the propulsion for the airplane. The supply with electrical energy takes place via the first DC cabling arrangement 140. The first motor power electronics system 151 converts the electrical energy provided to it in the form of a DC voltage DC into an AC voltage AC in order to drive the first motor 150.

The second subsystem 200 includes a second stator winding system 210 of the common electrical machine 300 of the drive system 10, a second power electronics system 220, a second battery 230, a second DC cabling arrangement 240 with a second branch point 241, and a second electric motor 250 with a second motor power electronics system 251, wherein the motor 250 is mechanically coupled to a second propeller 260 of the second subsystem 200. The stator winding systems 110, 210 are independent of one another, (e.g., the systems are not electrically connected to one another). The mode of operation of the second subsystem 200 corresponds to that of the first subsystem 100, wherein the second electric motor 250 draws the electrical energy required for operation from the second battery 230 and/or from the second stator winding system 210 via the second DC cabling arrangement 240 and via the respective power electronics system 251 and possibly 220. The second motor power electronics system 251 converts the electrical energy provided to it in the form of a DC voltage DC into an AC voltage AC in order to drive the second motor 250.

In order to avoid a lack of clarity, the positioning and size of the propellers 160, 260 do not necessarily reflect reality but serve merely to illustrate the interaction between the drive 10 and the propellers 160, 170.

Although the two stator winding systems 110, 210 are part of a common electrical machine 300, the two subsystems 100, 200 nevertheless operate independently of one another. The common electrical machine 300 is driven by an internal combustion engine 400, for example a turbine, if necessary. As already mentioned, the electrical machine 300 has a plurality of independent stator winding systems 110, 210 and also power electronics systems 120, 220 which are individually associated with them. For example, electrical energy may be conducted between the respective stator winding system 110 or 210 and the associated power electronics system 120 or 220 via a respective AC cabling arrangement 170, 270 connected between the winding systems 110, 210 and power electronics systems 120, 220 associated with one another. The illustration of the winding systems 110, 210, and in particular the illustration of the spatial arrangement in FIG. 1, is purely schematic and may not reflect reality. In practice, each of the stator winding systems 110, 210 includes a large number of coils that may be arranged in such a way that, as seen in the circumferential direction of a stator of the electrical machine 300, coils of the first stator winding system 110 and of the second stator winding system 210 are arranged alternately one behind the other.

When the internal combustion engine 400 is active, a rotor 310 of the common electrical machine 300, to which rotor permanent magnets 311 may be attached, is set in rotation via a shaft 410, so that, on account of an electromagnetic interaction, which is known per se, between the permanent magnets 311 and the coils, not illustrated in detail, of the stator winding systems 110, 210, electrical AC voltages are induced in the coils of the stator winding systems 110, 210. Because this aspect of the concept of the electrical machine in the generator mode has long been known, detailed explanations and illustration of the rotor 310 and of the permanent magnets 311 is dispensed with. For the sake of brevity, the coils of the winding systems 110, 210 are not mentioned further in the text which follows. When it is said that, for example, voltages are induced in the stator winding systems 110, 210 or that current is applied to the stator winding systems 110, 210, the intended meaning is that voltages are induced in the respective coils or that the coils of the winding systems 110, 210 are energized.

In a first operating state of the drive system 10, which is also referred to as the "normal mode" in the text which follows, the electrical energy or AC voltage which is provided in this way by the respective stator winding system 110, 210 is supplied to the power electronics system 120 or 220 associated with the respective stator winding system 110, 210 via the respective AC cabling arrangement 170, 270 and converted into a DC voltage there. The machine 300 accordingly operates entirely in the generator mode or in the manner of a generator. The DC voltages or the corresponding electrical energies are supplied to the respective battery 130, 230 via the DC cabling arrangements 140, 240 in order to charge the battery and/or to the motor power electronics systems 151, 251 of the two subsystems 100, 200 in order to provide electrical energy in the form of suitable electrical AC voltages to the motors 150, 250 for the purpose of driving them. In this case, the branch points 141, 241 are used in order to control the energy flows in the respective subsystem 100 or 200 with the aid of a controller 500 of the drive system 10.

Accordingly, in the first subsystem 100, the electrical energy may be conducted from the first power electronics system 120 to the first battery 130 as required in order to charge the first battery, and/or to the first motor power electronics system 151 of the first motor 150 in order to drive the first motor. Similarly, electrical energy may be conducted from the first battery 130 to the first motor power electronics system 151, once again in order to drive the first motor 150. The same applies to the second subsystem 200 in the normal mode. For example, the second branch point 241 arranged in the DC cabling arrangement 240 in the second subsystem causes electrical energy to be conducted, as required, from the second power electronics system 220 to the second battery 230 and/or to the second motor power electronics system 251 and also possibly also from the second battery 230 to the second motor power electronics system 251, in a manner controlled by the controller 500.

Here, the controller 500 influences not only the branch points 141, 241, but rather also the power electronics systems 120, 151, 220, 251 involved. Therefore, control of the drive system 10 with respect to the electrical energy flows between components of the drive system 10 is therefore based on an interaction between the branch points 141, 241 and the respective power electronics systems 120, 220 and possibly 151, 251. Therefore, the term "as required" is intended to be understood to mean that energy is not necessarily conducted via all of the power electronics systems 120, 151, 220, 251 depending on the components between which energy is intended to flow. If, for example, the first motor 150 is intended to be fed solely from the first battery 130, the first power electronics system 120 is not used for this purpose. If, in another exemplary case, the generator 300 or the second stator winding system 210 is intended both to charge the second battery 230 and also to supply the second motor 250 with energy, electrical energy flows both via the second power electronics system 220 and also via the second motor power electronics system 251.

In the normal mode, designed in this way, of the drive system 10 or the subsystems 100, 200, the stator winding systems 110, 210 operate in the manner of a generator in combination with the power electronics systems 120, 220 associated with them, (e.g., they provide electrical energy for the respective subsystem 100, 200). As already noted, the subsystems 100, 200 operate entirely independently of one another. In respect of the power balance of the electrical machine 300, in the normal mode for the exemplary case assumed here in which the electrical machine 300 has two winding systems 110, 210, the total power P_tot(t) of the electrical machine 300 at a time t will be double the powers P_110, P_210 of the individual winding systems 110, 210, i.e., P_110(t)=P_210(t)=½P_tot(t). This is the result of the fact that $$P\_tot(t)=P\_110(t)+P\_210(t).$$

Furthermore, the drive system 10 is designed in such a way that the stator winding systems 110, 210 may each operate in the manner of a motor in interaction with the rotor 310 and the magnets 311 located on it. In the "motor" mode, the stator winding system 110 or 210 which is in this mode has electrical AC voltage applied to it or is energized with the aid of the power electronics system 120 or 220 associated with the stator winding system 110 or 210. To this end, the respective power electronics system 120 or 220 draws the required electrical energy from the respective battery 130 or 230 to which it is connected. In the text which follows, it should be assumed purely by way of example and for explanatory purposes that the first stator winding system 110 of the first subsystem 100 is energized and accordingly operated in the manner of a motor. This operating state is referred to as the "first motor operating state" of the drive system 10. It should be clear here that the explanations correspondingly apply in a manner transmitted to the components of the second subsystem 200 if, rather than the first winding system 110, the second winding system 210 of the second subsystem 200 is energized, (e.g., in the "second motor operating state").

In the first motor operating state, the first battery 130 provides electrical energy which is converted into an AC voltage by the first power electronics system 120. This AC voltage is fed to the first stator winding system 110, so that alternating electric current is applied to the coils of the stator winding system. This leads to the occurrence of the electromagnetic interaction, which is known per se, between the magnetic fields generated in this way by the first stator winding system 110 or its coils and the magnetic fields of the permanent magnets 311 of the rotor 310. As is known, this generates a torque on the rotor 310. This torque acts in addition to the torque transmitted by the turbine 400 to the rotor 310 via the shaft 410, so that a larger so-called load angle has to be set in the second stator winding system 210 in order to maintain the torque equilibrium and therefore the rotation speed of the rotor 310. As a result, the second stator winding system 210 delivers additional electrical energy which may then be fed, once again controlled by the controller 500, to a desired target in the second subsystem 200, for example to the battery 230 and/or to the power electronics system 251 and to the motor 250. Therefore, energy was transmitted from the first subsystem 100 to the second subsystem 200.

The load angle introduced above describes the angle between the terminal voltage and the induced voltage of a respective stator winding system 110, 210. The level of an induced voltage changes only via the rotation speed of the rotor 310 with the magnets 311, but not via the torque acting on the rotor 310. A torque may be set in the individual winding systems 110, 210 via the load angle. Therefore, it is possible for one winding system 110, 210 to have a negative load angle and therefore a positive or motor torque and for the respectively other system 210, 110 to have a positive load angle, that is to say a negative or generator torque.

For the sake of completeness, in the case in which the first motor 150 is intended to still be supplied with electrical energy in this first motor operating state, this energy supply is provided with the aid of the first battery 130 because the first stator winding system 110 does not operate in the manner of a generator and accordingly does not feed any electrical energy to the first subsystem 100. Depending on the dimensions of the individual components of the drive 10, a case of this kind may therefore possibly be able to be implemented only when the motors 150, 250 are operating under partial load.

Energy transmission from the second subsystem 200 to the first subsystem 100 is possible in the same way, (e.g., in the second motor operating state). A detailed description is dispensed with at this point because the sequence is analogous to the procedure described above for the transmission from the first subsystem 100 to the second subsystem 200.

The two propeller drives or motors 150, 250 are accordingly supplied with electrical energy from their own battery 130 or 230 and/or via the electrical machine 300 which is operated in the manner of a generator via independent DC cabling arrangements 140 or 240 in the normal mode. One of the aims of this is to construct the two subsystems 100, 200 largely independently of one another in order to not lose both drives 150, 160 or 250, 260 at the same time in the event of a fault. On account of the described mode of operation of the controller 500, it is additionally possible to transmit energy between the otherwise independent subsystems 100, 200, that is to say for example from the battery 130 of the first subsystem 100 to the second subsystem 200 and to the motor 250 in the second subsystem or vice versa, in a respective first or second motor mode. This possibility may be highly advantageous in specific situations, for example in the event of failure of subcomponents, non-uniform states of charge of the batteries 130, 230 and/or in the event of aging of the batteries 130, 230.

The described approach is based on the concept of transmitting energy between the winding systems 110, 210 of the electrical machine 300 by way of a torque M_t on the shaft 410 which may be, for example, neutral in total for the internal combustion engine or the turbine 400. The situation that the torque M_t is neutral in total in the example is just one exemplary case. In principle, P_shaft=P_el_1+P_el_2 for the power balance of the generator. In this case. P_shaft represents the power, which is provided to the generator via the shaft, while P_el_1 and, respectively, P_el_2 represent the powers transmitted between the winding systems 110, 210 and the respectively associated subsystems 100, 200. In the case that P_el_1 or P_el_2 has a positive mathematical sign, it is assumed that power is fed from the electrical machine 300 to the respective subsystem 100, 200. In the case that power is transmitted from the first subsystem 100 to the second subsystem 200, P_el_1 is negative and P_el_2 is positive, that is to say, in particular, have different mathematical signs. However, the values |P_el_1| and |P_el_2| do not necessarily have to be the same.

The approach is based on opposite utilization of the two winding systems 110, 210 in order to transmit energy between the winding systems 110, 210 of the electrical machine 300 given comparatively small torques M_t applied by the turbine 400, where M_t=0 may also apply in principle. In this case, the expression "comparatively small torques" is related in particular to the fact that the described energy transmission may be realized at a time t, in particular, when the electrical machine 300 is not operated at its maximum possible power P_gen_max by the turbine 400 at this time t, that is to say when P_gen(t)≤thres_gen*P_gen_max, where P_gen(t) represents the power which is provided by the electrical machine 300 at the time t and thres_gen is a threshold value which may be prespecified by the controller 500 and for which 0≤thres_gen<0.5 may apply, for example. The upper limit assumed here for the threshold value thres_gen at a level of 0.5 instead of an upper limit of 1 which may be expected results given the practical assumption that the electrical energy is expediently transmitted from a respective winding system 110, 210 to the respectively other system 210, 110 only when 0≤thres_gen<0.5 because each winding system 110, 210 may be configured for a maximum power of 0.5*P_gen_max. Otherwise, the power of the electrical machine 300 may be unevenly distributed between the subsystems 100, 200, e.g., one of the subsystems 100, 200 may obtain more power than the other 200, 100 from the electrical machine 300 operated in the manner of a generator in the normal mode. On account of the availability of the capacitance or reserve power P_res(t)=P_gen_max-P_gen(t) of the electrical machine 300 that may not be used in the described case where P_gen(t)<P_gen_max, the reserve power P_res is available for transferring the energy between the subsystems 100, 200, where P_res may be greater than ½*P_gen_max. Finally, |P_trans|≤½|P_res| for the power P_trans, which may be transmitted from the supplying subsystem 100 to the system 200 to be supplied.

In addition to the requirement that the electrical machine 300 is not currently operated at its maximum power P_gen_max, (i.e., P_gen(t)≤thres_gen*P_gen_max), for the energy transmission, it is furthermore assumed that, at least for the duration of the transmission of energy from the—in order to stick with the example—first subsystem 100 to the second subsystem 200, the first subsystem 100 does not require from its battery 130 the in principle maximum available power P_bat130_max and that the battery 130 is therefore not fully utilized by the first subsystem 100 at the time t, (i.e., P_bat130(t)≤thres_bat130*P_bat130_max), where thres_bat130 is a threshold value which may be prespecified by the controller 500 and where 0≤thres_bat130<1, and P_bat130(t) represents the power which is provided by the corresponding battery 130 at the time t. In this case, the power of the battery 130 that may be spared may be used to supply the second subsystem 200.

The same would apply if the battery 230 of the second subsystem 200 was used in order to provide energy to the first subsystem 100. In this case, the requirement would be P_bat230(t)≤thres_bat230*P_bat230_max, where P_bat230(t) describes the power which is provided by the battery 230 at the time t, thres_bat230 is a threshold value which may be prespecified by the controller 500, and P_bat230_max represents the maximum power which may be provided by the battery 230.

The essence therefore lies in the utilization of reserve power of the two winding systems 110, 210 and also the battery 130 or 230 of a respective supplying subsystem 100 or 200 in order to provide energy from the battery of one subsystem 100, 200 to the respectively other subsystem 200, 100. In particular, one of the winding systems 110, 210 of the electrical machine 300 may selectively be operated as a motor and as a result reserve power of one battery 130, 230 may be used in order to provide energy from the battery 130, 230 of one subsystem 100, 200 to the other subsystem 200, 100.

The drive system 10 may be operated, in a manner prompted by the controller 500, in such a way that the drive system 10 is in the normal mode at least as long as there is no relevant fault in one of the subsystems 100, 200. In this case, the electrical machine 300 operates as a generator, (e.g., the electrical machine 300 feeds electrical energy into the two subsystems 100, 200). The controller 500 monitors the subsystems 100, 200 with regard to the presence of a relevant fault, for example in respect of failure of subcomponents of the subsystems 100, 200, in respect of non-uniform states of charge of the batteries 130, 230, in respect of excessive aging of the batteries 130, 230 etc. In the case that the controller 500 detects a relevant fault in one of the subsystems 100, 200, that is to say when one of the subsystems 100, 200 is faulty, the controller 500 may move the drive system 10 to the motor operating state. In the motor operating state of the drive system 10, electrical energy is transmitted from a supplying subsystem 100, 200 to a subsystem 200, 100 to be supplied.

However, in order to decide whether a change of this kind in the operating state of the drive system 10 from the normal mode to the motor operating state may take place, the requirements explained above are initially checked. To this end, the controller 500 is designed in such a way that, when it detects a relevant fault in one of the subsystems 100, 200 at a time T0, it firstly makes a check at a time T1 to determine the power $P\_gen(T1)$ at which the electrical machine 300 is currently being operated and secondly establishes the current utilization level $P\_bat(T2)$ of the battery 130, 230 of the subsystem 100, 200 without a fault at a time T2. In the case that firstly $P\_gen(T1) \leq thres\_gen * P\_gen\_max$ is met and secondly either $P\_bat230(T2) \leq thres\_bat230 * P\_bat230\_max$ in the event of a faulty first subsystem 100 or $P\_bat130(T2) \leq thres\_bat130 * P\_bat130\_max$ in the event of a faulty second subsystem 200 is met, the described method for energy transmission, (e.g., the motor mode), is initiated. In this case, the faulty subsystem, for example subsystem 200, is established as the subsystem to be supplied, while the non-faulty subsystem, that is to say the subsystem 100 in the selected example, is selected as the supplying subsystem.

Times T1, T2 may be identical and immediately follow time T0, so that the controller 500 may initiate the motor mode as quickly as possible after the relevant fault occurs. In respect of the threshold values thres_gen, thres_bat130, thres_bat230, these may be at a fixed value of—purely by way of example—60%. However, it is likewise conceivable and expedient for the threshold values to be defined by the controller 500 depending on the type of fault detected because, depending on the type of fault or depending on the type of component of the faulty subsystem 100, 200 affected by the fault, a greater or lesser amount of energy has to be transmitted from the supplying subsystem 100, 200 to the subsystem 200, 100 to be supplied. This fact may be taken into account by threshold values which may be defined depending on the situation. Furthermore, it may be expedient to define the threshold values depending on the flight situation prevailing when the fault occurs because different requirements may also be made here both of the quantity of energy to be provided to the subsystem 200, 100 to be supplied and also of the quantity of energy further required in the supplying subsystem 100, 200. Take-off or climb, approach to landing or cruising may be considered to be flight situations for example.

The concept has been described, without restricting the generality, for a system including just two subsystems 100, 200, wherein it has further been assumed purely by way of example that energy is intended to be transmitted from the first subsystem 100 to the second subsystem 200, that is to say that the drive system 10 is in the first motor operating state. It should be clear that firstly, in principle, any desired number of substantially identical, but mutually independent, subsystems of this kind would be realizable and that the drive system 10 is secondly designed in such a way that energy may likewise be transmitted from the second subsystem 200 to the first subsystem 100, corresponding to the second motor operating state of the drive system 10. However, for reasons of brevity, the latter case was not explained in detail because it does not differ in principle from the situation outlined in detail in which energy flows from the first system 100 to the second system 200. In order to describe this second motor operating state, the corresponding components of the first subsystem 100 and the second subsystem 200 would merely be exchanged with one another in the description of the first motor operating state.

For the sake of clarity, in a departure from the above description and from the illustration in FIG. 1, the propellers 160, 260 may also be designed entirely, for example, as fans of an electrically operated turbine or of a jet engine of this kind.

Although the disclosure has been described and illustrated more specifically in detail by the exemplary embodiments, the disclosure is not restricted by the disclosed examples and other variations may be derived therefrom by a person skilled in the art without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. An aircraft drive system comprising:
   a first subsystem for generating propulsion for an aircraft;
   a second subsystem for generating propulsion for the aircraft;
   an electrical machine comprising a first stator winding system and a second stator winding system, wherein in a normal mode of the aircraft drive system, a voltage induced in the first stator winding system is configured to be fed as electrical energy to the first subsystem and a voltage induced in the second stator winding system is configured to be fed as electrical energy to the second subsystem; and
   a controller configured to establish an operating state of the aircraft drive system in such a way that the aircraft drive system is operable in the normal mode or in a motor operating state, wherein, in the motor operating state in a manner controlled by the controller, one subsystem of the first or second subsystems is defined as a supplying subsystem and a further subsystem of the first or second subsystems is defined as a subsystem to be supplied, and electrical energy is configured to be transmitted from the supplying subsystem, via the first and second stator winding systems of the electrical machine, to the subsystem to be supplied, and wherein, in the motor operating state, at least a portion of the electrical energy which is transmitted by the supplying subsystem to the subsystem to be supplied is configured to be fed to a battery and/or to an electric motor of the subsystem to be supplied.

2. The aircraft drive system of claim 1, wherein the controller is configured to monitor the first subsystem and the second subsystem in respect of an occurrence of a fault in the respective subsystem and to initiate a change from the normal mode to the motor operating state when the fault is detected in the first subsystem or the second subsystem, and wherein the respective subsystem in which the fault is present is defined as the subsystem to be supplied.

3. The aircraft drive system of claim 1, wherein the controller is configured to determine a power $P\_gen(t)$ which is currently provided by the electrical machine, and wherein the controller is configured to initiate a change from the normal mode to the motor operating state at a time $t=T1$ only when $P\_gen(T1) \leq thres\_gen * P\_gen\_max$, where $P\_gen\_max$ is a maximum power provided by the electrical machine and $thres\_gen$ is a threshold value which is configured to be prespecified by the controller, where $0 \leq thres\_gen < 1/n$, where n represents a number of subsystems.

4. The aircraft drive system of claim 3, wherein the controller is configured to determine a power $P\_bat(t)$ currently provided by the battery of the supplying subsystem, and wherein the controller is configured to initiate the transmission of electrical energy from the supplying subsystem to the subsystem to be supplied starting from a time $t \geq T2$ only when $P\_bat(T2) \leq thres\_bat * P\_bat\_max$, where $P\_bat\_max$ is a maximum power provided by the battery of the supplying subsystem and $thres\_bat$ is a threshold value configured to be prespecified by the controller, where $0 \leq thres\_bat < 1$.

5. The aircraft drive system of claim 4, wherein the controller is configured to define the threshold values $thres\_gen$ and $thres\_bat$ depending on a type of fault detected and/or depending on a current flight situation.

6. The aircraft drive system of claim 1, wherein the first subsystem has a first propeller, a first electric motor for driving the first propeller, and a first battery, wherein the first electric motor is configured to be supplied with electrical energy in the normal mode selectively and in a manner controlled by the controller by the first battery and/or via the first stator winding system, wherein the second subsystem has a second propeller, a second electric motor for driving the second propeller, and a second battery, and wherein the second electric motor is configured to be supplied with electrical energy in the normal mode selectively and in a manner controlled by the controller by the second battery and/or via the second stator winding system.

7. The aircraft drive system of claim 1, wherein the controller is configured to determine a power $P\_bat(t)$ currently provided by the battery of the supplying subsystem, and wherein the controller is configured to initiate the transmission of electrical energy from the supplying subsystem to the subsystem to be supplied starting from a time $t \geq T2$ only when $P\_bat(T2) \leq thres\_bat * P\_bat\_max$, where $P\_bat\_max$ is a maximum power provided by the battery of the supplying subsystem and $thres\_bat$ is a threshold value configured to be prespecified by the controller, where $0 \leq thres\_bat < 1$.

8. The aircraft drive system of claim 7, wherein the controller is configured to define the threshold value, $thres\_bat$, depending on a type of fault detected and/or depending on a current flight situation.

9. The aircraft drive system of claim 3, wherein the controller is configured to define the threshold value, $thres\_gen$, depending on a type of fault detected and/or depending on a current flight situation.

10. The aircraft drive system of claim 1, wherein the portion of the electrical energy is configured to be provided by the battery of the supplying subsystem to the battery or the electric motor of the subsystem to be supplied via the first and second stator winding systems of the electrical machine.

11. An aircraft drive system comprising:
a first subsystem for generating propulsion for an aircraft;
a second subsystem for generating propulsion for the aircraft;
an electrical machine comprising a first stator winding system and a second stator winding system, wherein in a normal mode of the aircraft drive system, a voltage induced in the first stator winding system is configured to be fed as electrical energy to the first subsystem and a voltage induced in the second stator winding system is configured to be fed as electrical energy to the second subsystem; and
a controller configured to establish an operating state of the aircraft drive system in such a way that the aircraft drive system is operable in the normal mode or in a motor operating state,
wherein, in the motor operating state in a manner controlled by the controller, one subsystem of the first or second subsystems is defined as a supplying subsystem and a further subsystem of the first or second subsystems is defined as a subsystem to be supplied, and electrical energy is configured to be transmitted from the supplying subsystem, via the first and second stator winding systems of the electrical machine, to the subsystem to be supplied,
wherein the first and second stator winding systems are arranged independently of one another, and
wherein the first and second stator winding systems are arranged such that each winding system of the first and second stator winding systems interacts in an electromagnetic manner with magnetic components of a common rotor of the electrical machine.

12. A method for operating an aircraft drive system of an aircraft, the method comprising:
generating propulsion for the aircraft by a first subsystem of the aircraft drive system;
generating propulsion for the aircraft by a second subsystem of the aircraft drive system; and
selectively operating the aircraft drive system in a normal mode or in a motor operating state, wherein, in the normal mode, a voltage which is induced in a first stator winding system of an electrical machine of the aircraft drive system is fed as electrical energy to the first subsystem and a voltage which is induced in a second stator winding system of the electrical machine of the aircraft drive system is fed as electrical energy to the second subsystem, wherein, in the motor operating state, one subsystem of the first or second subsystems operates as a supplying subsystem and a further subsystem of the first or second subsystems operates as a subsystem to be supplied, and electrical energy is transmitted from the supplying subsystem, via the first stator winding system and the second stator winding system of the electrical machine, to the subsystem to be supplied, and wherein, in the motor operating state, at least a portion of the electrical energy which is transmitted by the supplying subsystem to the subsystem to be supplied is fed to a battery and/or to an electric motor of the subsystem to be supplied.

13. The method of claim 12, wherein the first subsystem and the second subsystem are monitored in respect of an occurrence of a fault in the respective subsystem, wherein a change from the normal mode to the motor operating state is initiated when the fault is detected in the first subsystem or the second subsystem, and wherein the subsystem in which the fault was detected is defined as the subsystem to be supplied.

14. The method of claim 13, wherein, when the occurrence of the fault is detected, a power $P\_gen(t)$ which is currently provided by the electrical machine is determined, and wherein the change from the normal mode to the motor operating state is initiated at a time $t=T1$ only when $P\_gen(T1) \leq thres\_gen*P\_gen\_max$, where $P\_gen\_max$ is a maximum power that is provided by the electrical machine and $thres\_gen$ is a prespecifiable threshold value, where $0 \leq thres\_gen < 1/n$, where n represents a number of subsystems.

15. The method of claim 14, wherein, when the occurrence of the fault is detected, a power $P\_bat(t)$ which is currently provided by the battery of the supplying subsystem is determined, and wherein the transmission of electrical energy from the supplying subsystem to the subsystem to be supplied starting from a time $t \geq T2$ is initiated only when bat $(T2) \leq thres\_bat*P\_bat\_max$, where $P\_bat\_max$ is a maximum power provided by the battery of the supplying subsystem and $thres\_bat$ is a prespecifiable threshold value, where $0 \leq thres\_bat < 1$.

16. The method of claim 15, wherein the prespecifiable threshold values $thres\_gen$ and $thres\_bat$ are defined depending on a type of fault detected and/or depending on a current flight situation.

17. The method of claim 13, wherein, when the occurrence of the fault is detected, a power $P\_bat(t)$ which is currently provided by the battery of the supplying subsystem is determined, and wherein the transmission of electrical energy from the supplying subsystem to the subsystem to be supplied starting from a time $t \geq T2$ is initiated only when bat $(T2) \leq thres\_bat*P\_bat\_max$, where $P\_bat\_max$ is a maximum power provided by the battery of the supplying subsystem and $thres\_bat$ is a prespecifiable threshold value, where $0 \leq thres\_bat < 1$.

18. The method of claim 17, wherein the threshold value $thres\_bat$ is defined depending on a type of fault detected and/or depending on a current flight situation.

19. The method of claim 14, wherein the threshold value $thres\_gen$ is defined depending on a type of fault detected and/or depending on a current flight situation.

20. The method of claim 12, wherein the portion of the electrical energy is provided by the battery of the supplying subsystem to the battery or the electric motor of the subsystem to be supplied via the first and second stator winding systems of the electrical machine.

* * * * *